United States Patent [19]
Rabbani et al.

[11] Patent Number: 5,956,467
[45] Date of Patent: Sep. 21, 1999

[54] ENCODING COLOR IMAGE DATA FOR MULTIPASS COLOR PRINTERS

[75] Inventors: Majid Rabbani, Pittsford; Chris W. Honsinger, Webster, both of N.Y.

[73] Assignee: Eastman Kodak Company, Rochester, N.Y.

[21] Appl. No.: 08/767,613

[22] Filed: Dec. 17, 1996

[51] Int. Cl.⁶ ........................................ H04N 1/64
[52] U.S. Cl. ............... 395/109; 382/166; 382/236; 382/238; 358/539
[58] Field of Search ................. 395/109, 104, 395/114, 116, 115; 382/238, 236, 166, 232, 250, 248; 358/539, 430, 432, 433

[56] References Cited

U.S. PATENT DOCUMENTS

| | | | |
|---|---|---|---|
| 4,809,350 | 2/1989 | Shimoni | 382/56 |
| 5,539,842 | 7/1996 | Schwartz | 382/232 |
| 5,663,764 | 9/1997 | Kondo et al. | 348/414 |
| 5,761,346 | 6/1998 | Moody | 382/254 |

*Primary Examiner*—Scott Rogers
*Attorney, Agent, or Firm*—Thomas H. Close

[57] ABSTRACT

A method for encoding color image data of the type having multiple color planes for a printer that prints the color planes in a given sequence includes the steps of: compressing the image data in the last color plane in the printing sequence and storing the resulting compressed data; using information relating to the image data in the previous color plane(s) to predict the image data in the next color plane to be printed; forming difference image data between the image data in the next color plane to be printed and the predicted image data for that color plane; and compressing the difference image data and storing the resulting compressed data. These steps are repeated until the image data for all of the color planes have been compressed and stored.

16 Claims, 6 Drawing Sheets

ENCODING COLOR IMAGE DATA FOR MULTIPASS COLOR PRINTERS

APPENDIX

The disclosure in the appendix of this patent document contains material to which a claim of copyright protection is made. The copyright owner has no objection to the facsimile reproduction of any one of the patent documents or the patent disclosure as it appears in the U. S. Patent and Trademark Office patent file or records, but reserves all other rights whatsoever.

FIELD OF THE INVENTION

The invention relates generally to the field of electronic imaging, and in particular to encoding of color digital images that are to be printed by multipass digital color printers.

BACKGROUND OF THE INVENTION

In the practice of electronic color imaging it is often desirable to print a digital color image using a digital color printer such as a thermal printer. The color image may be represented as a set of three color planes, usually red, green, and blue (RGB). Alternatively, it may be represented as the set of four color planes, usually cyan, magenta, yellow and black (CMYK). The color printer usually prints the image by printing one color plane at a time in a prescribed order, e.g., in a four color system, the cyan plane may be printed first, the magenta next, followed by the yellow and finally the black plane.

Two classes of memory configurations are common for color printers. The first class applies to low cost printers. Here only a stripe (subsection) of a single color plane is employed. When the printer completes the printing of this stripe, the printer waits until it receives more data. There are three concerns with this type of configuration. The first is that the server (i.e. the computer asking the printer for service) must buffer the data while the printer is printing. This can consume large amounts of disk space and slow down the computer response time due to the system interruptions necessary to manage this buffer. Second, the network line to the printer will be busy throughout the printing process, which causes a prolonged delay for other users who are sharing the network. Finally, delays in the network connection can cause a delay in providing the image data to the printer. This requires a print head that is capable of stopping and resuming in the middle of the printing process, creating additional engineering and hardware costs that are not desirable.

The second class of printers includes higher end color printers that contain sufficient local memory for storing the entire image at the time of printing. In general, given the high price of solid state memory (e.g., SRAM and DRAM), it is desirable to keep the printer memory requirements to a minimum. Also, in order to expedite the data transfer process for the printing of the next image, it is desirable to discard the data related to each color plane of the current image once it has been printed, so that the memory thus made available can be used to download the color planes of the next image in the printer queue.

In order to satisfy these requirements, in the prior art, each color plane of the image to be printed is compressed independently using a compression scheme such as the lossy or the lossless JPEG compression standard. The JPEG compression standard is explained in detail in ITU Recommendations T.81, T.83 and T.84, or alternatively, in ISO/IEC International Standards, 10918-1, 10918-2, and 10918-3.

It is well known that, in general, there exists a significant correlation between the various color planes of a color image. Consequently, to increase the amount of compression achieved on a color image, this correlation should be reduced to the extent possible prior to the compression process. A conventional method of reducing the correlation among the color planes is to apply a linear decorrelating transformation to the color planes. This is sometimes referred to also as a color space rotation. For example, if the color image is represented as RGB tri-stimulus, it can be transformed into another color space representation such as the YUV luminance-chrominance space. Many different standard and proprietary color space transformations exist and the equations for such transformations have been documented in the literature.

Although applying a conventional color space transformation to the color image data prior to compression (e.g., with the JPEG standard) increases the amount of compression achieved in printers, it does not allow the data that corresponds to a certain color plane to be discarded after that color plane has been printed. As an example, consider the YUV luminance-chrominance color space representation of an RGB color image. Further, assume that the order in which the color planes are printed is blue, red, and green, respectively, and that the decompression and printing of each color plane is done in stripes. The first step in this process would be to decompress a stripe of the compressed YUV color planes. Next, a stripe of the blue color plane would be reconstructed from the decompressed YUV stripes and printed. Since the same YUV color planes are needed in order to also reconstruct the red and the green color planes, no stripes of the compressed data can be discarded until the whole color image has been printed. That is why in prior art each RGB (or CMYK) color plane is independently compressed and then decompressed at the time of printing.

There is a need therefore to improve the performance of image compression in this second class of printers to minimize the cost of the printer memory.

SUMMARY OF THE INVENTION

The present invention is aimed at reducing the memory requirements on board a multipass printer, while allowing the printer to discard the color plane image data after it has been printed. Briefly summarized, according to one aspect of the present invention, a method for encoding color image data of the type having multiple color planes for a multipass color printer that prints the color planes in a given sequence is disclosed. The method includes the steps of: compressing the image data in the last color plane in the printing sequence and storing the resulting compressed data; using information relating to the image data in the previous color plane(s) to predict the image data in the next color plane to be printed; forming difference image data between the image data in the next color plane to be printed and the predicted image data for that color plane; and compressing the difference image data and storing the resulting compressed data. These steps are repeated until the image data for all of the color planes have been compressed and stored.

ADVANTAGEOUS EFFECT OF THE INVENTION

The present invention has the advantage of reducing memory requirements on board a multipass printer, while allowing the printer to discard the color plane image data after it has been printed.

DETAILED DESCRIPTION OF THE INVENTION

Figure 1:
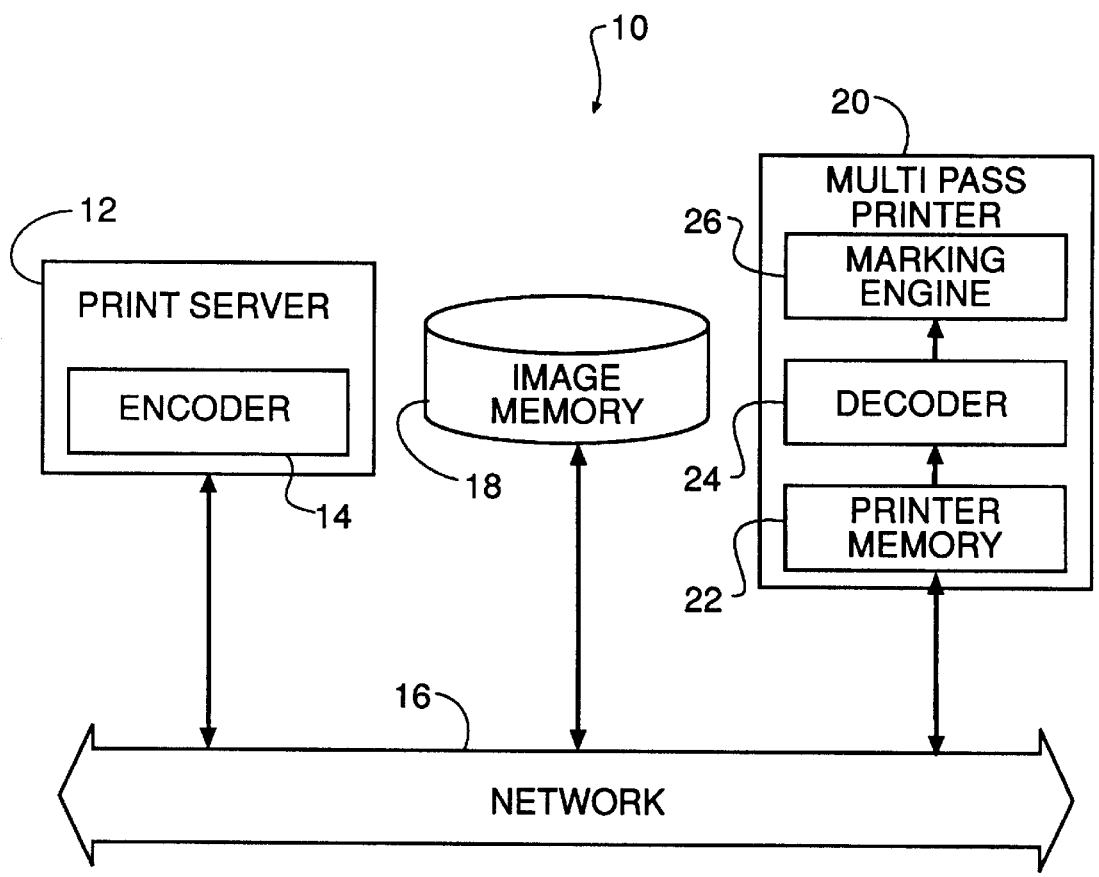
FIG. 1 is schematic diagram of a printing system including a multi-pass printer useful with the present invention

Referring to FIG. 1, a printing system 10 useful with the present invention includes a print server 12, for example, a suitably programmed personal computer, having an encoder 14 for enoding a color image according to the present invention. The print server communicates over a network server 16, with an image memory 18, and a multi-pass printer 20, for example, a Kodak XL8600 thermal printer. The multi-pass printer 20 includes a printer memory 22 for the temporary storage of the color image from the image memory 18, a decoder 24 for decoding the color image signal stored in printer memory 22, and a marking engine 26 for printing the color image signal. At the time of printing, the decoder 24 decodes the data residing in the printer memory 22 to reconstruct the color planes of the color image and prints them in a prescribed order.

The present invention improves the image compression efficiency and hence reduces the cost of memory in digital color printers by reducing the correlation among the color planes prior to compression. This correlation reduction is performed in such a way that at the decoder, once a given color plane has been printed, the related encoded image data can be deleted from the memory to accommodate the loading of the data corresponding to the next image in the printer queue.

For the purpose of describing the encoding and the decoding procedures according to the present invention, assume that the color image consists of n color planes denoted by $P_i$, i=1,2, . . . , n. Further, without any loss of generality, assume that the printer requires these color planes to be printed in the following sequence of $P_n, P_{n-1}, \ldots, P_1$. For example, a color image can consist of four components, cyan, magenta, yellow, and black, denoted by CMYK, and the order of the printing can be cyan, followed by magenta, yellow, and black, respectively. Although the present invention applies to any choice of compression schemes, it is convenient to use the JPEG compression standard to compress the image data. The JPEG compression standard compresses the data by dividing it into 8×8 blocks and compressing each block separately. As a result, the JPEG compression in addition to being an international standard, is also suitable for compressing the image data in stripes. The JPEG compression can provide either lossless compression or lossy compression. In lossless compression, the decompressed image data are mathematically identical to the original image data, while in lossy compression, the decompressed image data are different from the original image data where the extent of this difference depends on the degree of compression achieved. Since lossless compression typically results in only a modest amount of compression (usually around 2:1), lossy compression is often preferred in printer applications. With JPEG compression, the amount of loss and the degree of compression can be controlled by changing the elements of an 8×8 array called the quantization table. In general, a lossy compression scheme such as the JPEG standard includes three steps: transformation or decomposition, quantization, and symbol encoding. The transformation step reduces the correlation or the redundancy in the data to make it more amenable to compression. The quantization step, which is where the loss in lossy compression is introduced, maps ranges of input values into a single quantized value and thus reduces the size of the data to be encoded. Finally, the symbol encoding step translates the quantizer output values into a string of bits (binary "1" and "0" digits).

According to the present invention, color correlation reduction is achieved by ensuring that the redundant information in a given color plane is reduced by using only the color plane information available at the print buffer at the time of printing. In general, compression performance is improved over prior art since the information present in a given color plane that is also contained in the succeeding color planes in the order of printing is reduced. Either lossy or lossless compression algorithms may be chosen.

The encoding and decoding of the color plane data need not be performed using the entire color plane. Sub-regions of the color planes such as stripes or small rectangles may be used to perform the operations. Breaking the color plane into sub-regions has the advantage of requiring less memory and for certain embodiments, improved compression performance.

Figure 2:
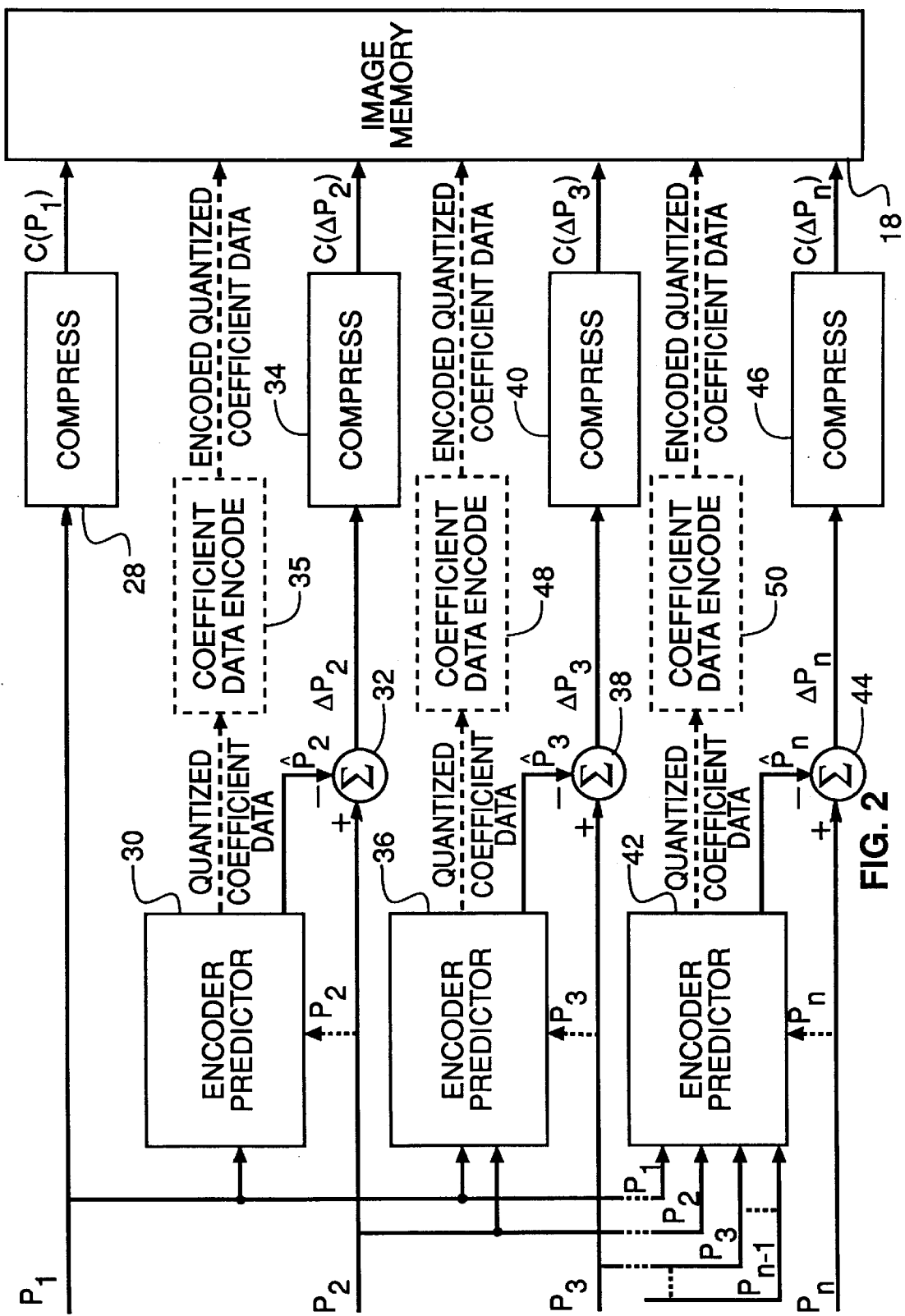
FIG. 2 is a schematic diagram of the encoder described in a preferred embodiment of this invention

In a preferred embodiment of the present invention as shown in FIG. 2, the color plane that will be printed last, namely, $P_1$, is first compressed 28 independent of any other color plane and is stored in the image memory 18. For the encoding of the color plane $P_2$, first the correlation between that color plane and all the color planes that have been previously encoded, namely $P_1$ in this case, is reduced. In particular, the previous color planes are used to form a prediction of $P_2$ denoted by $\hat{P}_2$ in encoder predictor 30, which is then subtracted 32 from $P_2$ to form a difference image $\Delta P_2$. This difference image $\Delta P_2$ is compressed 34 and stored in image memory.

The prediction used at the encoder predictor 30 can be either linear or nonlinear as will be described later. Furthermore, the prediction can be either causal or noncausal. In causal predictors, only the data that has been encoded prior to the encoding of the current data is used for prediction. Since the decoder also has access to all the past data used by the encoder for prediction, the causal prediction operation can be exactly repeated at the decoder. An example of causal prediction is when a previous color plane, e.g., $P_1$, is used as the prediction for the next color plane to be encoded, e.g., $P_2$. In this case, the difference image is simply the pixel by pixel difference between the color planes $P_1$ and $P_2$.

On the other hand, in noncausal prediction both the information contained in the previously encoded data and the information that has not yet been encoded may be used to form the prediction. Since the noncausal information is not available at the decoder, the decoder has to be instructed as to how to construct the exact same prediction. This is usually accomplished by including additional information, i.e. overhead information, along with the prediction. As an example of noncausal prediction, consider finding the optimum linear prediction of the color plane $P_2$ using the color plane $P_1$. This procedure, which will be described in detail later, uses the color plane $P_2$ in addition to the color plane $P_1$. As a result, the encoder appends the prediction coefficient data to the prediction as overhead. At the decoder, this overhead information is used to construct the exact same prediction that was used at the encoder. In FIG. 2, it is assumed that the noncausal information, if used at all by the encoder predictor 30, is the actual color plane which is shown as a dotted line input to the predictor. Also, the overhead information resulting from noncausal prediction is shown with dotted lines at the output of the encoder predictor 30 and is referred to herein as the "quantized coefficient data". This quantized coefficient data may then be further compressed in the encoder 35 prior to storing in image memory 18.

Continuing in the same vein for the encoding of the other color planes, when encoding color plane $P_3$, first the correlation between that color plane and all the color planes that have been previously encoded, namely $P_1$ and $P_2$ in this case, is reduced in encoder predictor 36. In particular, the previous color planes (in addition to the current color plane in the case of noncausal prediction) are used to form a prediction of $P_3$ denoted by $\hat{P}_3$, which is then subtracted 38 from $P_3$ to form the difference image $\Delta P_3$. This difference image is compressed 40 and stored in image memory 18. This process is continued until all of the color planes have been compressed and stored in image memory 18, as shown generally by encoder predictor 42, difference operator 44, and compressor 46. Similarly, coefficient data resulting from predictors 36 and 42 may be further compressed in encoders 48 and 50 respectively.

It should be noted that in the general case shown in FIG. 2, any or all combinations of the previous color planes may be used in order to predict the color plane that is currently being processed. However, for practical reasons, in many situations only a single color plane (e.g., the one printed last) or a limited number of previous color planes are actually used to predict the current color plane. Our findings indicate that even using a single color plane for prediction in many cases results in a significant improvement in compression efficiency.

Figure 3:
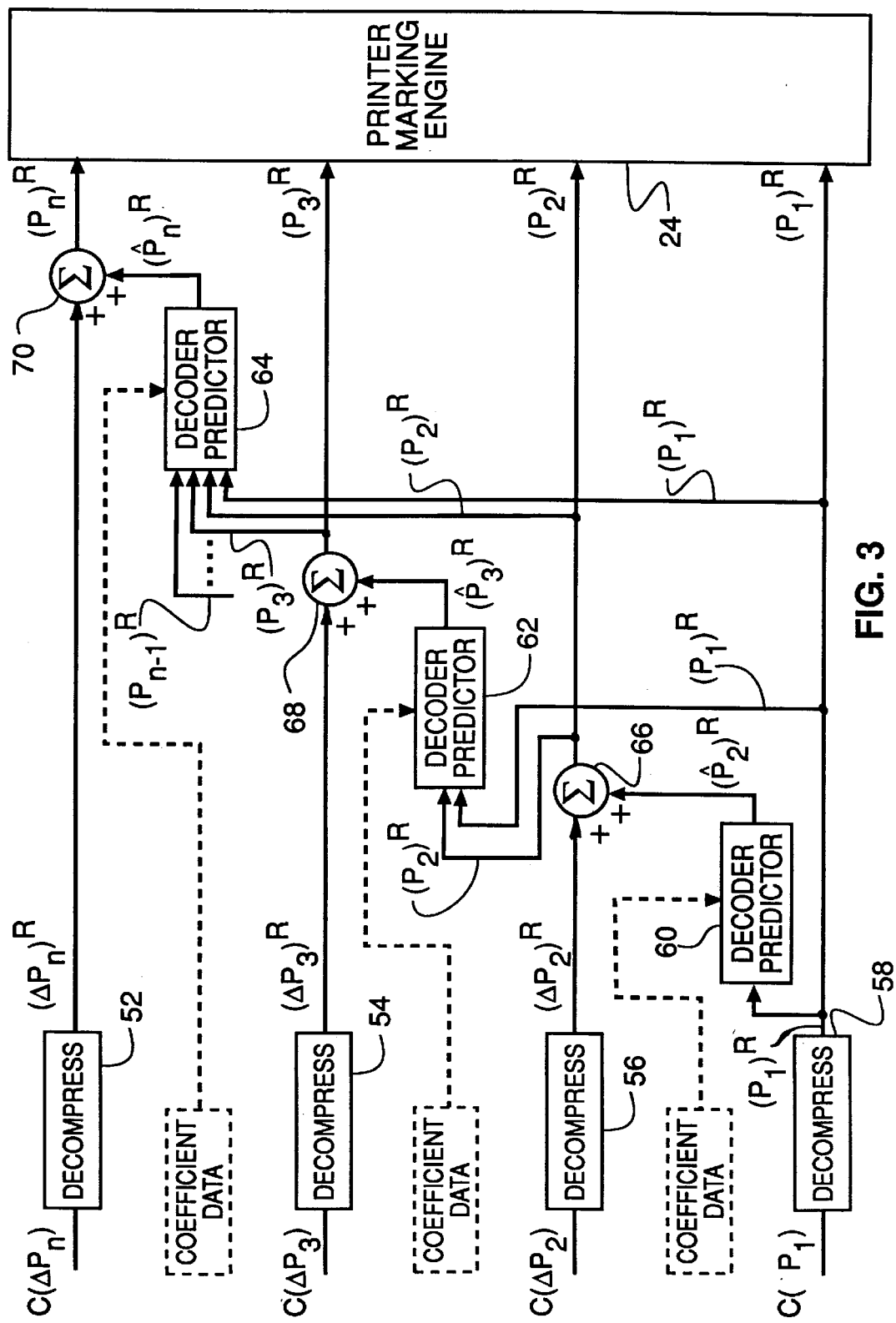
FIG. 3 is a schematic diagram of the decoder described in a preferred embodiment of this invention

The decoding is performed at the printer by simply reversing the above process as is shown in FIG. 3. At the decoder the color planes can be recovered from the compressed data in the desired order for printing while the compressed data corresponding to a particular color plane can be discarded after that color plane has been printed. To reconstruct a stripe of the first color plane to be printed $P_n$, the stripe of compressed color data $C(\Delta P_n)$ is decompressed 52, and a corresponding stripe of all of the previously compressed data $C(P_1)$, $C(\Delta P_2)$, ..., $C(\Delta P_{n-1})$ is first decompressed 54, 56, and 58. Since in most cases the compression scheme used is a lossy compression scheme, the decompressed values will not be exactly the same as the original values prior to compression. As noted above, the degree to which the decompressed values approximate the original values depends on the amount of quantization employed during the compression process. In our notation, we refer to the decompressed image values as the reconstructed values and we denote them by the superscript R. For example, if the compressed color plane $P_1$ is represented by $C(P_1)$, the decompressed (reconstructed) color plane $P_1$ is denoted by $(P_1)^R$. Obviously, if lossless compression has been used, then $(P_1)^R$ is the same as $P_1$.

In reference to FIG. 3, to reconstruct the ith color plane, first the reconstructed values of the previous color planes are used to form a prediction of that color plane, $(\hat{P}_i)^R$, using the decoder predictors 60, 62 and 64 consecutively. Additionally, in the case of noncausal prediction the overhead information labeled as "quantized coefficient data" (the dotted lines in FIG. 3) is also used in constructing the prediction $(\hat{P}_i)^R$. This prediction is then added 66, 68, and 70, consecutively, to the reconstructed difference image for that color plane, $(\Delta P_i)^R$, to yield the reconstructed value of that color plane denoted by $(P_i)^R$. The reconstructed color plane data for the ith color plane $(P_i)^R$ is then sent to the printer marking engine 24 for printing, after which it may be purged from memory. Similarly, the compressed data $C(\Delta P_i)$, corresponding to the ith color plane just printed can be purged from memory.

As noted above, for practical reasons, in most cases only a single color plane or a limited number of previous color planes are actually used to predict the current color plane. For example, our findings indicate that by using a single color plane, e.g., $P_1$, to predict all of the other color planes, the operations of both the encoder and the decoder are significantly simplified while the compression efficiency is still significantly improved compared to the prior art.

Figure 4:
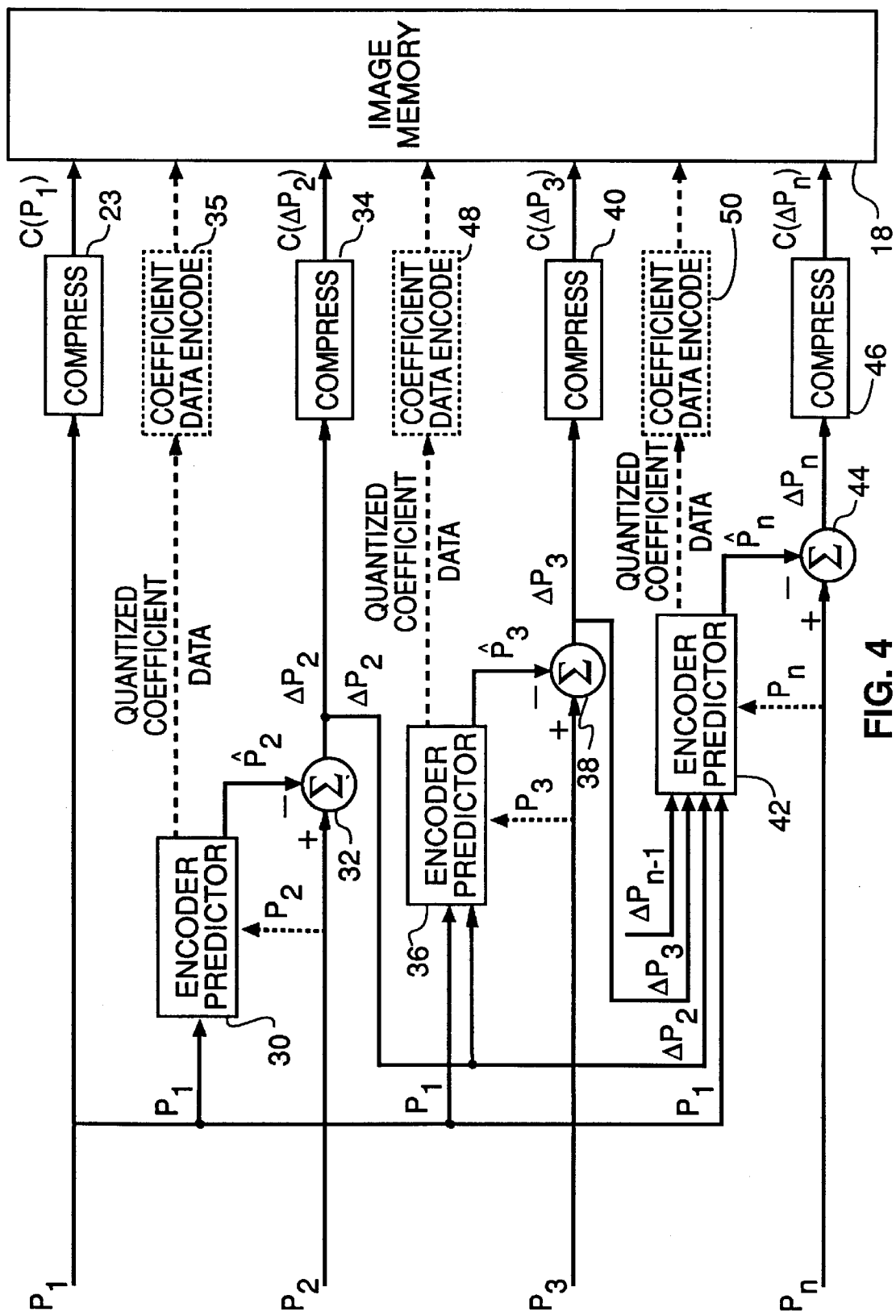
FIG. 4 is a schematic diagram of the encoder described in an alternative embodiment of this invention
Figure 5:
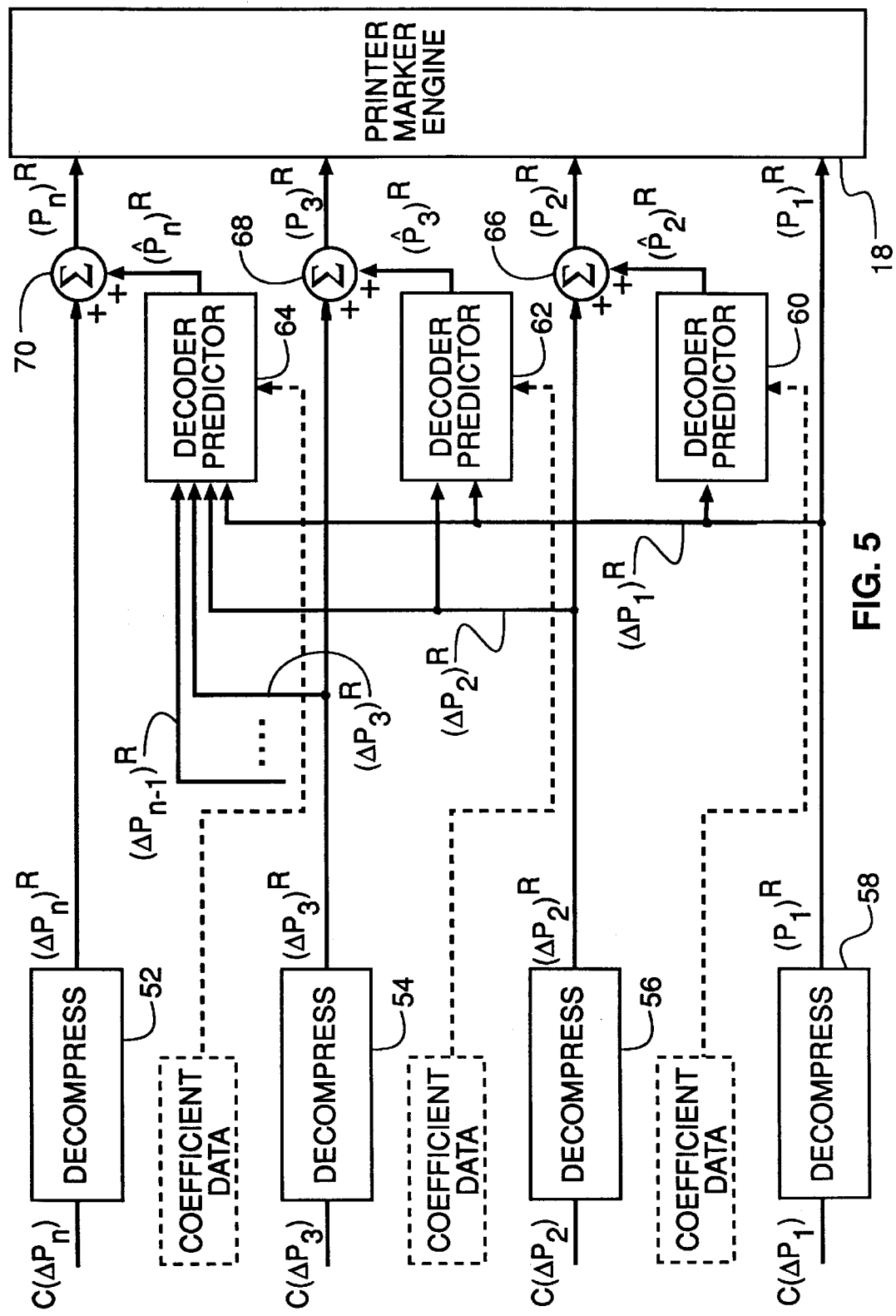
FIG. 5 is a schematic diagram of the decoder described in an alternative embodiment of this invention

In an alternative embodiment of the present invention as described in FIG. 4, the color plane that will be printed last, namely, $P_1$, is first compressed 28 independent of any other color plane and is stored in the image memory 18. Next, the color plane $P_1$ is used to form a prediction 30 of the next color plane $P_2$ denoted by $\hat{P}_2$, which is then subtracted 32 from $P_2$ to form the difference image $\Delta P_2$. This difference image is compressed 34 and stored in image memory 18. As noted before, the prediction can either be linear or nonlinear or it can be either causal or noncausal. In general, for the encoding of any given color plane $P_i$, the last color plane to be printed $P_1$ and all of the color plane differences formed up to that stage, i.e., $\Delta P_2, \ldots, \Delta P_{i-1}$, are used to predict that color plane. The difference image $\Delta P_i$ formed by subtracting the prediction image values $\hat{P}_i$ from the original image values $P_i$ is compressed and stored. This process is continued until all of the color planes have been compressed and stored. The main difference between this embodiment and the one described in FIG. 2 is that in predicting a given color plane $P_i$, the set of $P_1, \Delta P_2, \ldots, \Delta P_{i-1}$ values are used instead of the set $P_1, P_2, \ldots, P_{i-1}$. This generally results in a simpler encoder and decoder configuration. The decoder process is depicted in FIG. 5 and is simply the reverse of the operations performed at the encoder.

A potential limitation of the embodiments described in FIG. 2 and FIG. 4 is that the predictions computed at the encoder are based on the original color plane values whereas at the decoder, only the decompressed (reconstructed) values are available. If the compression process is lossless, the predictions calculated at the encoder which are based on the original data, and the predictions calculated at the decoder, which are based on the decompressed data, are identical. However, in most cases lossy compression is used in printers and the predictions made at the encoder and the decoder will be different. This problem is addressed in a further aspect of the present invention, where the compression efficiency of the technique of the invention is further improved by using at the encoder the same reconstructed values that are available at the decoder to construct the prediction. One way of achieving this is to decompress the compressed data at the encoder prior to forming the prediction. A short cut to this process can be introduced by recognizing the fact that the discrepancies between the original values and the reconstructed (compressed/decompressed) values result from the quantizer in the lossy compression scheme. Thus, to access the reconstructed values, it is not necessary to decompress the compressed bit stream. Instead, during the process of compression, the output of the quantizer step can be used to produce the exact same data that will be reconstructed at the decoder.

Figure 6:
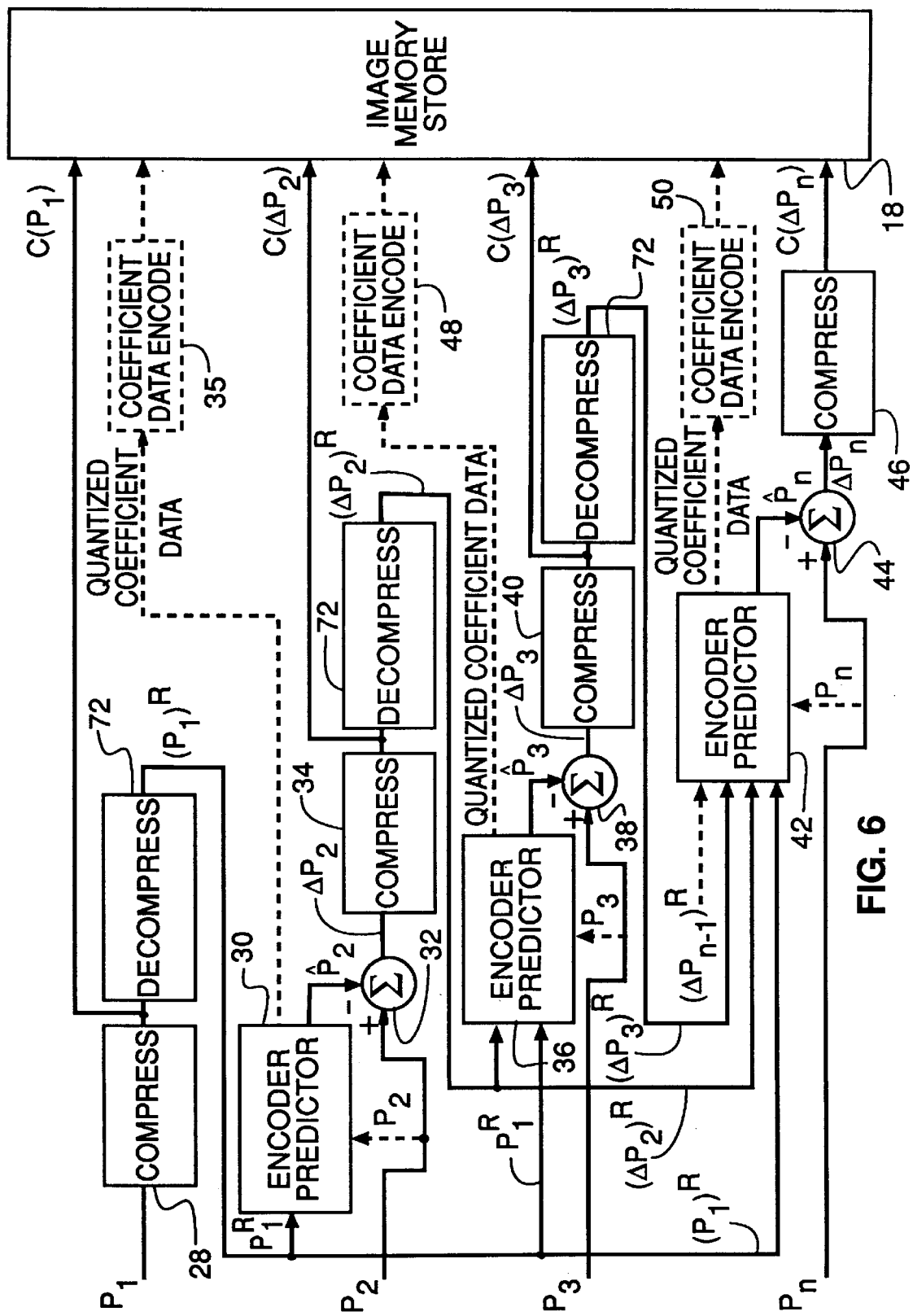
FIG. 6 is a schematic diagram of the encoder described in another alternative embodiment of this invention To facilitate understanding, identical reference numerals have been used, where possible, to designate identical elements that are common to the figures.

According to a further aspect of the present invention as depicted in FIG. 6, the color plane that will be printed last, namely, $P_1$, is first compressed independent of any other color plane and is stored in the memory. Next, the compressed color plane $P_1$ is reconstructed (e.g., decompressed 72) and the reconstructed color plane $(P_1)^R$ is used to form a prediction 30 of $P_2$ denoted by, $\hat{P}_2$ which is then subtracted from $P_2$ 32 to form the difference image $\Delta P_2$. As noted above, the reconstructed color plane $(P_1)^R$ can alternatively be produced from the output of the quantizer during the compression process. This difference image is compressed 34 and stored in image memory 18. In general, for the encoding of any given color plane $P_i$, the reconstructed last color plane $(P_1)^R$ and all of the reconstructed color plane differences formed up to that stage, i.e., $(\Delta P_2)^R, \ldots, (\Delta P_{i-1})^R$, are used to predict that color plane. The difference image $\Delta P_i$ formed by subtracting the prediction image values from the original image values is compressed and stored. This process is continued until all of the color planes have been compressed and stored. The decoder process, which is simply the reverse of the operations performed at the encoder, is the same as the previous embodiment described with reference to FIG. 5.

The preferred linear predictors employed in encoder predictors 30, 36 and 42 will now be described in further detail. As noted before, in one embodiment of the invention as described in FIG. 2, the ith color plane is predicted as a function of the previously processed color planes. In the case of a linear predictor, the prediction is expressed as a linear weighting of the previous color planes as in the following equation:

$$\hat{P}_i = \phi_{i,1} P_1 + \phi_{i,2} P_2 + \ldots \phi_{i,i-1} P_{i-1},$$

where $\phi_{i,j}$ are constants. The above equation represents each pixel of the predicted color plane as a linear combination of the corresponding pixels in the previous color planes, where the weights for the color plane i are given by the set of constants $\{\phi_{i,j}\}$, $j=1,2,\ldots,i-1$, also referred to as the predictor coefficients. If the predictor is causal, then the predictor coefficients are fixed for all images and are also known to the decoder. A simple but important example is using only the last color plane $P_1$ for prediction and using a single fixed predictor coefficient $\alpha$. In this case the predictor simply becomes $\hat{P}_i = \alpha P_1$, where the value of $\alpha$ can be determined empirically for each color plane and can then be used for all images. When using noncausal predictors, the predictor coefficients can be optimized for each individual image and the particular color plane that is being predicted. Since these image-dependent predictor coefficients are not known to the decoder, they should be included as overhead information with the encoded file. Furthermore, instead of using the same set of predictor coefficients for the entire color plane, the color plane can be broken down into stripes or any other arbitrary shaped regions, and an optimum set of predictors can be found for each region which again is included as overhead information.

In the case of noncausal prediction, the optimum set of linear predictor coefficients can be found by minimizing the square of the prediction error $\Delta P_i \equiv \hat{P}_i - P_i$. In particular, it can be shown that for the ith color plane, the optimum set of i-1 coefficients, $\{\phi_{i,j}\}$, $j=1,2,\ldots,i-1$, is the solution to the following set of i-1 equations:

$$\frac{\partial}{\partial \phi_{i,j}} \left[(\hat{P}_i - P_i) \bullet (\hat{P}_i - P_i)\right] = 0, j = 1, 2, \cdots i - 1.$$

The operator "·" represents the "dot product" between the two images. The dot product between two images A and B, with dimensions of $N_x$ pixels per line and $N_y$ lines per image, is defined as the sum of the product of each pixel value from image A with the corresponding pixel value from image B, namely:

$$A \bullet B = \sum_{k=1}^{N_y} \sum_{l=1}^{N_x} A_{k,l} B_{k,l},$$

where, e.g., $A_{k,l}$ represents the pixel value at row k and column l of image A.

To better illustrate the noncausal prediction process, consider the encoder predictor 42 in FIG. 2 as an example of all the encoder predictors. The prediction part of the output of the encoder predictors is $$\hat{P}_n = \phi_{n,1} P_1 + \phi_{n,2} P_2 + \ldots \phi_{n,n-1} P_{n-1},$$

where the n-1 weights are found by solving the following set of n-1 equations:

$$\frac{\partial [(P_n - \phi_{n,1} P_1 + \phi_{n,2} P_2 + \cdots \phi_{n,n-1} P_{n-1}) \bullet (P_n - \phi_{n,1} P_1 + \phi_{n,2} P_2 + \cdots \phi_{n,n-1} P_{n-1})]}{\partial \phi_{n,j}} = 0, j = 1, 2, \cdots n - 1.$$

Since the values of these weights are not available at the decoder, they need to be included as overhead information. This is accomplished by the dotted line output of encoder predictor labeled "quantized coefficient data". Finally, if the image has been broken into stripes or any other arbitrary shaped regions, for each region the above set of equations is solved and an optimum set of predictor coefficients is determined. In this case, the "quantized coefficient data" output of encoder predictor includes all the coefficient sets for the different regions in addition to any information needed to identify each coefficient set with its corresponding region or stripe.

In another embodiment of the present invention as depicted in FIG. 4, the set of color difference data are used in the encoder predictors boxes 30, 36 and 42 to predict the current color plane. Using the color difference data instead of the color plane data usually results in a simpler decoder. Recall that in all of the embodiments of the present invention, the compressed files are of the color difference data. As a result, instead of having to reconstruct all the previous color planes, the decoder simply uses the corresponding reconstructed color difference data as input to the decoder predictor boxes 60, 62 and 64 of FIG. 5. The linear predictor in this case is given by $$\hat{P}_i = \theta_{i,1} P_1 + \theta_{i,2} \Delta P_2 + \ldots \theta_{i,i-1} \Delta P_{i-1},$$

where the i-1 coefficients, $\{\theta_{i,j}\}$, $j=1,2,\ldots,i-1$, are constants. As noted before, for causal prediction, the above constants are image-independent and are fixed for each color plane. In the case of noncausal prediction, the minimum means-squared-error optimum predictor coefficients are the solution to the following set of i−1 equations:

$$\frac{\partial}{\partial \theta_{i,j}}[(\hat{P}_i - P_i) \bullet (\hat{P}_i - P_i)] = 0, j = 1, 2, \cdots i-1.$$

It can be shown that solving the above equations would result in the following value for the weight $\theta_{i,j}$:

$$\theta_{ij} = \begin{cases} \frac{(\Delta P_i \bullet P_1)}{(P_1 \bullet P_1)}, & j = 1 \\ \frac{(\Delta P_i \bullet \Delta P_j)}{(\Delta P_i \bullet \Delta P_i)}, & j \neq 1 \end{cases} \text{ for } i \geq 2.$$

The above procedure is also referred to as the Gram-Schmidt orthogonalization process. In essence, the linear correlation between the color plane $P_i$ and all the previous data, $P_1$, $\Delta P_2$, . . . , $\Delta P_{i-1}$, is removed by creating a color plane difference $\Delta P_i$ that is orthogonal to all the previous data, i.e., $\Delta P_i \cdot P_1 = 0$, and $\Delta P_i \cdot \Delta P_j = 0$, $1 < j < i$.

As before, the optimum set of coefficients needs to be included in the encoded file as overhead information. The coefficients are represented by line outputs from the encoder predictors 30,36,42 in FIG. 4. Also, if the image has been broken into stripes or any other arbitrary shaped regions, for each region the above set of equations is solved and an optimum set of predictor coefficients is determined. It can be mathematically shown that when using optimum linear prediction, the predictions resulting from the corresponding encoder predictors depicted in FIG. 2 and FIG. 4 are identical. Since the decoder of FIG. 5 is much simpler to implement in practice as compared to the decoder of FIG. 3, this latter embodiment is preferred in conjunction with using optimum linear predictors.

It should be noted that the coefficient data resulting from optimum linear prediction is generally expressed in floating point notation. In order to efficiently encode and store this data, it needs to be quantized to a finite number of bits. This quantization takes place in the encoder predictors 30, 36 and 42. The quantization can be either uniform or nonuniform. A preferred method of uniform quantization in this invention is the following $$\phi_{i,j}{}^q = q \times \text{NINT}\left(\frac{\phi_{i,j}}{q}\right),$$

where q is typically a negative power of two and is much smaller than one, e.g., $q=2^{-7}$, and the NINT operation denotes rounding to the nearest integer, e.g., NINT(3.2)=3, while NINT(3.8)=4. The q value is the granularity of the quantizer. Uniform quantization is simple to implement and has optimal properties when used in conjunction with variable length coding in the "coefficient data encode" unit 35, 48, 50. On the other hand, if fixed-length coding is used to encode the coefficient data, it is advantageous to perform nonuniform quantization. We have observed that the coefficient data has a probability distribution that is closely approximated by a double-sided exponential distribution, also known as a Laplacian distribution. As a result, a preferred method of nonuniform quantization in this invention is a Lloyd-Max nonuniform minimum mean-squared-error (MMSE) quantizer designed for a Laplacian probability distribution.

It should be noted that the calculation of the coefficient data can be strongly influenced by the mean value of the image sub-regions. As a result, it is often advantageous to remove the mean value of each sub-region that is input to the encoder predictors 30, 36, 42 prior to the calculation of the coefficient data. This will tend to stabilize the distribution of the coefficient data towards a Laplacian and thus make it more amenable to quantization and encoding. However, this will also create a zero-mean prediction of the subregion, whereas the color plane being predicted usually has a zero mean. As a result, this will create a bias in the color plane difference data. This bias is encoded by the compressors 28, 34, 40 and 46. Similarly, at the decoder, the mean value of the subregions input to the decoder predictors 60, 62 and 64 are removed prior to the prediction calculation.

When the present invention is used in conjunction with the JPEG compression standard, instead of removing the mean value of each sub-region, the mean value of each 8×8 block can be removed prior to the calculation of the coefficient data at the encoder. This is particularly advantageous with the JPEG standard, since JPEG, when applied to the color difference data, performs a differential (DPCM) encoding of the mean values of each 8×8 block.

Since the quantized coefficients are not equal to the original coefficients, it is important to use the quantized coefficients to form the prediction in the encoder predictor boxes 30, 36, and 42. Otherwise the prediction at the decoder, which is based on the quantized coefficient values, will differ from the prediction made at the encoder.

In general, when using optimum linear prediction in a color image with n color planes, n(n−1)/2 predictor coefficients are generated for every stripe or sub-region of the image. These quantized coefficients are then encoded by the "coefficient data encode" box 35, 48, 50 before being stored in the image memory 18. The encoding process converts the quantized coefficient data values into fixed-length or variable-length codewords. When using variable-length codes, the data corresponding to the different sub-regions of the image can be differentially encoded to further reduce the filesize corresponding to the quantized coefficient data. For example, for each color plane, the difference between the value of a quantized coefficient of a given sub-region and the corresponding value of the quantized coefficient of the previous sub-region is found and variable-length coded. A preferred method of variable-length coding in the present invention is Huffman coding. However, in many cases the file size associated with the predictor coefficient data is only a small fraction of the overall compressed image file size. As a result, the quantized coefficient data can also be fixed-length coded. In such a case, it is usually advantageous to use a Lloyd-Max nonuniform MMSE quantizer designed for a Laplacian probability as described before.

It was mentioned before that the general method described in the present invention is applicable to any method used to compress the color difference data. The JPEG compression standard has found widespread use in many applications involving compression of continuous tone images due to its compression efficiency and availability of hardware and software implementations. If the JPEG standard is used as a preferred method of compression in conjunction with the present invention, the considerations noted below can help improve the efficiency of the overall system.

In general, the JPEG compression standard segments the image into 8×8 blocks and applies a discrete cosine transform to each 8×8 block. The DCT coefficients that are obtained in this manner are uniformly quantized using a user-defined quantization matrix and are then variable-length coded using a Huffman coder. If the JPEG standard is used in conjunction with the optimum linear predictor described before, the predictor can use the DCT-domain representation of each color plane (or each color difference image) instead of its image-domain representation. This constitutes no compromise in the optimality of the process since the DCT transform is also a linear transformation. As a result, the optimum prediction coefficients in the DCT domain will be similar in value to the ones derived in the image domain. However, using the DCT-domain representation can result in a simpler encoder and decoder structure, especially in the case of the encoder depicted in FIG. 6.

Also, when choosing the size of the stripe or the region for prediction optimization, it is advantageous to choose the dimensions of the region to be an integer multiple of 8 in order to align the regions boundaries with the DCT block boundaries. Our findings indicate that for photographic type imagery, a square region between 32–64 pixels wide delivers optimum compression. For regions less than this, the cost of transmitting and storing the associated coefficient data may out-weigh the benefit of the reduced dimensions for color plane differencing.

Finally, in certain applications it may be advantageous to use a nonlinear predictor instead of a linear predictor. A common method of applying a nonlinear predictor is to first process a given color plane with a look-up table (LUT) and then apply a linear predictor as described above. An example of such an application is when the image is generated from a desktop application program such as a word processor or a desktop publisher and is stored in an RGB format. Since the high quality printers usually use four color planes, e.g., CMYK, a transformation from RGB to the CMYK space is applied to the RGB data prior to printing. If the transformation from RGB to CMYK were a linear color transform, the optimum linear predictor described in this invention would be sufficient to remove the resulting correlation. However, the color transform applied to the RGB data is generally designed to compensate for the gamut limitations of the printer inks and specific printer mechanisms which are likely to be of non-linear nature. As a result, a linear operation would not be sufficient in removing that correlation. Fortunately, the color transformation is often known, and it is possible to effectively invert it by constructing a LUT. This LUT is applied to each color plane prior to the linear prediction stage. Thus, the combination of this LUT operation and the linear prediction creates a nonlinear prediction process. Finally, it should be noted that the nonlinear effect needs to be reintroduced at the decoder end before the data is rendered to the print medium.

A computer program written in the C++ language for performing the encoding and decoding process of the present invention is included in Appendix A.

The invention has been described with reference to a preferred embodiment. However, it will be appreciated that variations and modifications can be effected by a person of ordinary skill in the art without departing from the scope of the invention.

APPENDIX A

```
#include "image.h"
float thresh = 0.001f;
#define COEFF_MAX (.75)
#define COEFF_MIN (-.75)
int dct_dim=8;
```

APPENDIX A-continued

```
image image::remove_dc_from_blocks(int dimx,int dimy)
{
    int i,j,line,pixel,fast;
    float sum=0.0f;
    image idc (get_nbands( ),get_npix( )/dimx,get_nlin( )/dimy,32);
    if(get_nbits( )!=32) deepcpy(change_bits_to(32));
    for(int ib=0;ib<get_nbands( );ib++)
    {
        for(line=0;line<get_nlin( );line+=dimy)
        {
            for(pixel=0;pixel<get_npix( );pixel+=dimx)
            {
                sum=0.0f;
                for(j=line;j<(line+dimy);j++)
                {
                    fast = (pixel+dimx);
                    for(i=pixel;i<fast;i++)
                    {
                        sum+=get_pixel(ib,i,j);
                    }
                }
                sum/=(dimx*dimy);
                idc.put_pixel(sum,ib,pixel/dimx,line/dimy);
                for(j=line;j<(line+dimy);j++)
                {
                    fast = (pixel+dimx);
                    for(i=pixel;i<fast;i++)
                    {
                        put_pixel( (get_pixel(ib,i,j)-sum) ,ib,i,j);
                    }
                }
            }
        }
    }
    return(idc);
}
void image::add_dc_to_blocks(const image &idc, int dimx,int dimy)
{
    int i,j,line,pixel,fast;
    float dc=0.0f
    if(get_nbits( )!=32) deepcpy(change_bits_to(32));
    for(int ib=0;ib<get_nbands( );ib++)
    {
        for(line=0;line<get_nlin( );line+=dimy)
        {
            for(pixel=0;pixel<get_npix( );pixel+=dimx)
            {
                dc=idc.get_pixel(ib,pixel/dimx,line/dimy);
                for(j=line;j<(line+dimy);j++)
                {
                    fast = (pixel+dimx);
                    for(i=pixel;i<fast;i++)
                    {
                        put_pixel( (get_pixel(ib,i,j)+dc) ,ib,i,j);
                    }
                }
            }
        }
    }
}
double dot(const image& v1,const image& v2,int ib1,int ib2)
{
    int line=0;
    int pixel=0;
    double dot = 0;
    for(line=0;line<v2.get_nlin( );line++)
    {
        for(pixel=0;pixel<v2.get_npix( );pixel++)
        {
            dot+=(v1.get_pixel(ib1,pixel,line)*v2.get_pixel
                (ib2,pixel,line));
        }
    }
    return(dot/(v1.get_npix( )*v1.get_nlin( )));
}
```

APPENDIX A-continued

```
void main(int argc, char *argv[ ])
{
    if(argc<5)
    {
        printf("\n\nUsage:: gs block_size gs_quant dct_quant
        infile direction\n");
        printf("Decorrelates input bands\n");
    }
    else if (atoi(argv[5])>0)   // decorrelate
    {
        printf("\n Forward adaptive GS\n");
        int j,sj=0,si=0;
        thresh = .1f;
        float dct_q=(float)atof(argv[3]);
        float gs_q=(float)atof(argv[2]);
        int dim=atoi(argv[1]);
        image a(argv[4]);
        {
            image b=a;
            a.put_band(b,0,3);
            a.put_band(b,1,2);
            a.put_band(b,2,1);
            a.put_band(b,3,0);
        }
        image idc=a.remove_dc_from_blocks(dim,dim);
        idc.save("dc.tif");
        int nbc= (a.get_nbands( )-1)*a.get_nbands( )/2;
        image coeff(nbc,a.get_npix( )/dim,a.get_nlin( )/dim,32);
        image small;
        for( j=0;j<a.get_nlin( );j+=dim)
        {
            for(int i=0;i<a.get_npix( );i+=dim)
            {
                small = a.copy(i,j,i+dim-1,j+dim-1);
                small= small.decorr(&coeff,i/dim,j/dim,gs_q);
                a.paste(i,j,small);
            }
        }
        a.save("gs.tif");
        a.forward_dct_blocks(dct_dim);
        image mom= a.get_band(0);
        a.zero_high_frequencies_of_dct_block(dct_dim);
        a.put_band(mom,0,0);
        a.quantize_dct_blocks(dct_q,dct_dim,"c.tif");
        idc.compress_dct_blocks(MIN(idc.get_npix( ),dim),
        "dc.bin","dc.his");
        coeff.compress_dct_blocks(MIN(idc.get_npix( ),dim),
        "coeff.bin","coeff.his");
        a.compress_dct_blocks(MIN(idc.get_npix( ),dct_dim),
        "gs.bin","p.his");
        coeff.save("coeff.tif");
    }
    else // recorrelate
    {
        printf("\n Inverse adaptive GS\n");
        int j,sj=0,si=0;
        float dct_q=(float)atof(argv[3]);
        float gs_q=(float)atof(argv[2]);
        int dim=atoi(argv[1]);
        int dim2=dim/2;
        image a=decompress_dct_blocks("gs.bin");
        image coeff =decompress_dct_blocks("coeff.bin");
        image idc = decompress_dct_blocks("dc.bin");
        image small;
        a.invert_quantization_dct_blocks(dct_q,dct_dim,"c.tif");
        a.inverse_dct_blocks(dct_dim);
        for( j=0;j<a.get_nlin( );j+=dim)
        {
            for(int i=0;i<a.get_npix( );i+=dim)
            {
                small = a.copy(i,j,i+dim-1,j+dim-1);
                small= small.recorr(&coeff,i/dim,j/dim,gs_q);
                a.paste(i,j,small);
            }
        }
        a.add_dc_to_blocks(idc,dim,dim);
        {
            if(a.get_nbands( )==4)
            {
                image b=a;
                a.put_band(b,0,3);
                a.put_band(b,1,2);
                a.put_band(b,2,1);
                a.put_band(b,3,0);
            }
        }
        a.deepcpy(a.change_bits_to(8));
        a.save("decomp.tif");
    }
}
image image::decorr( image *c, int bx, int by,float q)
{
    int     sum=0;
    double  *var, *coeff;
    image   *gs;
    gs     = new image  [get_nbands( )];
    var    = new double [get_nbands( )];
    coeff  = new double [get_nbands( )];
    image ret=*this;
    gs[0] = ret.get_band(0);
    var[0] = dot(gs[0],gs[0],0,0);
    ret.put_band(gs[0],0,0);
    sum=0;
    for(int ib=1;ib<(ret.get_nbands( ));ib++)
    {
        image v= ret.get_band(ib);
        float val;
        image vp=v;
        val=0.0f;
        for(int kk=0;kk<ib;kk++)
        {
            if (var[kk]>thresh)
            {
                coeff[kk]=dot(v,gs[kk],0,0)/var[kk];
                {
                    if (coeff [kk]>COEFF_MAX)
                    coeff[kk]=COEFF_MAX;
                    else if(coeff[kk]<COEFF_MIN)
                    coeff[kk]=COEFF_MIN;
                }
                coeff[kk]/=q;
                if(coeff[kk]>0)
                {
                    coeff[kk]=((int)(coeff[kk]+.5));
                }
                else
                {
                    coeff[kk]=((int)coeff[kk]-.5);
                }
            }
            else
            {
                coeff[kk]=0.0;
            }
            for(int jj=0;jj<v.get_nlin( );jj++)
            {
                for(int ii=0;ii<vp.get_npix( );ii++)
                {
                    val = vp.get_pixel(0,ii,jj);
                    val-=(float)(q*coeff[kk]*gs[kk].get_pixel(0,
                    ii,jj));
                    vp.put_pixel((float)(int)(val),0,ii,jj);
                }
            }
        }
        gs[ib]=vp;
        ret.put_band(gs[ib],ib,0);
        var[ib]=dot(gs[ib],gs[ib],0,0);
        for(int uu=0;uu<ib;uu++)
        {
            c->put_pixel((float)coeff[uu];sum,bx,by);
            sum++;
        }
    }
}
```

APPENDIX A-continued

```
            delete [ ] gs;
            delete [ [ var;
            delete [ ] coeff;
            return(ret);
    }
}
image image::recorr( image *c, int bx, int by,float   q)
{
    float v;
    image gs=*this;
    for (int 1=0;1<get_nlin( );1++)
    {
        for(int p=0;p<get_npix( );p++)
        {
            // 1
            if(get_nbands( )>1)
            {
                v = get_pixel(1,p,l)+   q*c->get_pixel(0,
                    bx,by)*get_pixel(0,p,l);
                gs.put_pixel((float)(int)v,1,p,l);
            }
            // 2
            if(get_nbands( )>2)
            {
                v = get_pixel(2,p,l)+   q*c->get_pixel(1,
                    bx,by)*get_pixel(0,p,l)+
                        q*c->get_pixel(2,bx,by)*get_pixel(1,p,
                            l);
                gs.put_pixel((float)(int)v,2,p,l);
            }
            // 3
            if(get_nbands( )>3)
            {
                v = get_pixel(3,p,l)+   q*c->get_pixel(3,
                    bx,by)*get_pixel(0,p,l)+
                        q*c->get_pixel(4,bx,by)*get_pixel(1,p,
                            l)+
                        q*c->get_pixel(5,bx,by)*get_pixel(2,p,
                            l);
                gs.put_pixel((float)(int)v,3,p,l);
            }
        }
    }
    if(get_nbands( )>4)
    {
        printf("Too many bands!");
        exit(1);
    }
    return(gs);
}
image image::get_band(int bnd_no)
{
    float val;
    if(bnd_no>=get_nbands( ))
    {
        error("Not enough bands for requested data!");
    }
    image ref(1,get_npix( ),get_nlin( ),get_nbits( ));
    for(int j=0;j<get_nlin( );j++)
    {
        for(register int i=0;i<get_npix( );i++)
        {
            val = get_pixel(bnd_no,i,j);
            ref.put_pixel(val,0,i,j);
        }
    }
    return(ref);
}
void image::put_band(image &ref,int dest_bno,int ref_bno)
{
    char util [128];
    if( (ref.get_nbands( )<=ref_bno)||
        (get_nbands( )<=dest_bno) )
    {
        ref.report("Image Reference");
        report("Image destination");
        sprintf(util,"Trying to put band %d into
            band %d", ref_bno ,dest_bno);
        error(util);
    }
    float val;
    int ppp=MIN(get_npix( ),ref.get_npix( ));
    int lll=MIN(get_nlin( ),ref.get_nlin( ));
    for(int j=0;j<lll;j++)
    {
        for(register int i=0;i<ppp;i++)
        {
            val = ref.get_pixel(ref_bno,i,j);
            put_bounded_pixel(val,dest_bno,i,j);
        }
    }
}
#include "huffman.h"
#define HIST_FILE_LENGTH 16
void image::quantize_dct_blocks(float quant,int dim,char *csf_file)
{
    int i,j,ii,jj,ib
    float v;
    image csf(csf_file)
    if(dim!=csf.get_npix( )) csf=csf.resample(dim,dim);
    int dim2=dim/2
    float test;
    for( ib=0;ib<get_nbands( );ib++)
    {
        if(ib==0) test=1.0*quant;
        else test =quant,
        for(jj=0;jj<get_nlin( );jj+=(dim))
        {
            for( ii=0;ii<get_npix( );ii+=(dim))
            {
                for(j=jj;j<(jj+dim);j++)
                {
                    for( i=ii;i<(ii+dim);i++)
                    {
                        v = get_pixel(ib,i,j);
                        v/=
                            (test*csf.get_pixel(0,i-ii,j-jj) );
                        if(v<0) v-=.5f;
                        else v+=.5f;
                        put_pixel((float)((int)(v)),
                            ib,i,j);
                    }
                }
            }
        }
    }
}
void image::zero_high_frequencies_of_dct_block(int
dct_dim)
{
    int i,j,ii,jj,ib;
    int sx,sy,ex,ey;
    int dim2=dct_dim
    for( ib=0;ib<get_nbands( );ib++)
    {
        for(jj=0;jj<get_nlin( );jj+=(dct_dim))
        {
            for( ii=0;ii<get_npix( );ii+=(dct_dim))
            {
                sy=jj+dim2
                ey=jj+dct_dim;
                for(j=sy;j<(ey);j++)
                {
                    sx=ii+dim2;
                    exii+dct_dim;
                    for( i=sx;i<(ex);i++)
                    {
                        put_pixel(0.0f, ib,i,j)
                    }
                }
            }
        }
    }
}
void image::invert_quantization_dct_blocks(float
quant,int dim,char *csf_file)
{
    int i,j,ii,jj,ib;
    float v;
```

APPENDIX A-continued

```
            float test;
            image csf(csf_file);
            if(dim!=csf.get_npix( )) csf=csf.resample(dim,dim);
            for( ib=0;ib<get_nbands( );ib++)
    { if(ib==0) test=1.0*quant;
            else test =quant;
            for(jj=0;jj<get_nlin( );jj+=(dim))
            {
                    for( ii=0;ii<get_npix( );ii+=(dim))
                    {
                            for(j=jj;j<(jj+dim);j++)
                            {
                                    for( i=ii;i<(ii+dim);i++)
                                    {
                            //      if(i!=ii&&j!=jj)
                                            {
                                                    v= (get_pixel(ib,i,j)
                                                    *csf.get_pixel
                                                    (0,i-ii,j-jj)
                                                    *test) ;
                                                    put_pixel((float)v,
                                                    ib,i,j);
                                            }
                                    }
                            }
                    }
            }
    }
}
void image::compress_dct_blocks(int dim,char *out_file,
char *hist_file)
{
            int blck_elms,hist_elms,ib,j,i,k,fmin,fmax,nrun,val,ii,jj;
            int amp_offset,run_offset;
            hist *prob;
            prob = new hist;
            int *xarray=get_x_array( dim);
            int *yarray=get_y_array( dim);
            // Find the bounds for the histogram table
            fmin=(int)get_pixel(0,0,0);
            fmax=fmin;
            for( ib=0;ib<get_nbands( );ib++)
            {
                    for(j=0;j<get_nlin( );j++)
                    {
                            for( i=0;i<get_npix( );i++)
                            {
                                    fmin=(int)MIN(fmin,get_pixel(ib,i,j));
                                    fmax=(int)MAX(fmax,get_pixel(ib,i,j));
                            }
                    }
            }
            fmin--;
            fmax++;
            blck_elms = dim*dim;
            amp_offset=-fmin;
            run_offset = fmax -fmin +1;
            hist_elms = fmax -fmin +1 + blck_elms +1;
            prob->initialize(hist_elms);
            nrun=0;
            for(jj=0;jj<get_nlin( );jj+=(dim))
            {
                    for( ii=0;ii<get_npix( );ii+=(dim))
                    {
                            for( ib=0;ib<get_nbands( );ib++)
                            {
                                    nrun=0;
                                    for(k=0;k<blck_elms;k++)
                                    {
                                            i =xarray[k]+ii;
                                            j = yarray[k]+jj;
                                            val = (int)get_pixel(ib,i,j);
                                            if(val!=0)
                                            {
                                                    // If prior was a run, update...
                                                    if(nrun!=0)
                                                    {
                                                            prob->increment
                                                            (nrun+run_offset);
                                                            nrun=0;
                                                    }
                                                    prob->increment(val+amp_offset);
                                            }
                                            else
                                            {
                                                    nrun++;
                                            }
                                    }
                                    if(nrun!=0) // Last k check
                                    {
                                            prob->increment(nrun+run_offset);
                                            nrun=0;
                                    }
                            }
                    }
            }
            huffman *huff;
            huff = new huffman;
            huff->initialize(prob->get_ptr( ),hist_elms,1);
            char *stream;
            long pos=0;
            int stream_size = get_npix( )*get_nlin( )*get_nbits( )
            *get_nbands( )/8;
            stream = new char [stream_size];
            memset(stream,0,stream_size);
            nrun=0;
            for(jj=0;jj<get_nlin( );jj+=(dim))
            {
                    for( ii=0;ii<get_npix( );ii+=(dim))
                    {
                            for( ib=0;ib<get_nbands( );ib++)
                            {
                                    nrun=0;
                                    for(k=0;k<blck_elms;k++)
                                    {
                                            i =xarray[k]+ii;
                                            j = yarray[k]+jj;
                                            val = (int)get_pixel(ib,i,j);
                                            if(val!=0)
                                            {
                                                    if(nrun!=0)
                                                    {
                                                            huff->encode_symbol
                                                            (nrun+run_offset,stream,&pos);
                                                            nrun=0;
                                                    }
                                                    huff->encode_symbol
                                                    (val+amp_offset,stream,&pos);
                                            }
                                            else
                                            {
                                                    nrun++;
                                            }
                                    } // End k
                                    if(nrun!=0) // Last k check
                                    {
                                            huff->encode_symbol(nrun+run_offset,
                                            stream,&pos);
                                            nrun=0;
                                    }
                            }
                    }
            }
            int pix=get_npix( ),lin=get_nlin( ),bnds=get_nbands( ),
            bits=get_nbits( );
            float quant =0.0f;
            long stream_extent=((pos+7)/8);
            FILE *fp;
            char hf[HIST_FILE_LENGTH];
            sprintf(hf, "%s",hist_file);
            fp = fopen(out_file, "wb");
            fwrite(&pix,sizeof(long),1,fp);
            fwrite(&lin,sizeof(long),1,fp);
            fwrite(&bnds,sizeof(long),1,fp);
            fwrite(&bits,sizeof(long),1,fp);
            fwrite(&hist_elms,sizeof(long),1,fp);
            fwrite(&fmin,sizeof(long),1,fp);
```

APPENDIX A-continued

```
fwrite(&fmax,sizeof(long),1,fp);
fwrite(&blck_elms,sizeof(long),1,fp);
fwrite(&dim,sizeof(long),1,fp);
fwrite(&stream_extent,sizeof(long),1,fp);
fwrite(&quant,sizeof(float),1,fp);
fwrite(hf,sizeof(char),HIST_FILE_LENGTH,fp);
prob->save(hf);
fwrite(&stream[0],1,stream_extent,fp);
fclose(fp);
delete huff;
delete prob;
delete [ ] xarray;
delete [ ] yarray;
}
image decompress_dct_blocks(char *infile)
{
    float quant;
    int blck_elms,hist_elms,ib,j,i,k,fmin,fmax,val,ii,jj,dim;
    int pix,lin,bnds,bits;
    int amp_offset,run_offset,nrun=0;
    long stream_extent;
    huffman *huff;
    huff = new huffman;
    char *stream;
    char hist_file_name[HIST_FILE_LENGTH];
    FILE *fp;
    fp = fopen(infile, "rb");
    fread(&pix,sizeof(long),1,fp);
    fread(&lin,sizeof(long),1,fp);
    fread(&bnds,sizeof(long),1,fp);
    fread(&bits,sizeof(long),1,fp);
    image a(bnds,pix,lin,bits);
    long pos=0;
    int stream_size = a.get_npix( )*a.get_nlin( )
        *a.get_nbits( )*a.get_nbands( )/8;
    stream = new char [stream_size];
    memset(stream,0,stream_size);
    fread(&hist_elms,sizeof(long),1,fp);
    fread(&fmin,sizeof(long),1,fp);
    fread(&fmax,sizeof(long),1,fp);
    fread(&blck_elms,sizeof(long),1,fp);
    fread(&dim,sizeof(long),1,fp);
    fread(&stream_extent,sizeof(long),1,fp);
    fread(&quant,sizeof(float),1,fp);
    fread(hist_file_name,sizeof(char),HIST_FILE_LENGTH,fp);
    hist *prob;
    prob = new hist;
    prob->initialize(hist_file_name);
    huff->initialize(prob->get_ptr( ),prob->get_nelm( ),1);
    delete prob;
    //huff->initialize_from_serialization(fp);
    fread(&stream[0],1,stream_extent,fp);
    fclose(fp);
    int *xarray=get_x_array( dim);
    int *yarray=get_y_array( dim);
    amp_offset=-fmin;
    run_offset = fmax -fmin +1;
    pos =0;
    int raw_value;
    for(jj=0;jj<a.get_nlin( );jj+=(dim))
    {
        for( ii=0;ii<a.get_npix( );ii+=(dim))
        {
            for( ib=0;ib<a.get_nbands( );ib++)
            {
                nrun=0;
                for(k=0;k<blck_elms;k++)
                {
                    i =xarray[k]+ii;
                    j = yarray[k]+jj;
                    // If we're not unraveling a run
                    if(nrun==0) raw_value =
                        huff->decode_symbol(stream,&pos);
                    if(raw_value<run_offset)
                    {
                        val = raw_value-amp_offset;
                        a.put_pixel((float)val,ib,i,j);
                    }
                    else
                    {
                        if(nrun==0)
                            nrun=raw_value-run_offset;
                        a.put_pixel((float)0.0,ib,i,j);
                        nrun--;
                    }
                }
            }
        }
    }
    fclose(fp);
    delete [ ] stream;
    delete huff;
    delete [ ] xarray;
    delete [ ] yarray;
    return(a);
}
```

PARTS LIST

| | |
|---|---|
| 10 | printing system |
| 12 | print server |
| 14 | encoder |
| 16 | network server |
| 18 | image memory |
| 20 | multi-pass printer |
| 22 | printer memory |
| 24 | decoder |
| 26 | marking engine |
| 28 | compression step |
| 30 | encoder predictor |
| 32 | subtraction step |
| 34 | compression step |
| 35 | encoder |
| 36 | encoder predictor |
| 38 | subtraction step |
| 40 | compression step |
| 42 | encoder predictor |
| 44 | difference operator |
| 46 | compressor |
| 48 | encoder |
| 50 | encoder |
| 52–58 | decompression steps |
| 60–64 | decoder predictors |
| 66–70 | addition step |
| 72 | decompression step |

We claim:

1. A method for encoding color image data of the type having multiple color planes for a printer that prints the color planes in a given sequence, comprising the steps of:
   a) compressing the image data in the last color plane in the printing sequence and storing the resulting compressed data;
   b) using information relating to the image data in the previous color plane(s) to predict the image data in the next color plane to be printed;
   c) forming difference image data between the image data in the next color plane to be printed and the predicted image data for that color plane;
   d) compressing the difference image data formed in step c) and storing the resulting compressed data;
   e) repeating steps b)–d) until the image data for all of the color planes have been compressed and stored.

2. The method for encoding color image data claimed in claim 1, wherein the information relating to the image data in the previous color plane(s) is the image data.

3. The method for encoding color image data claimed in claim 1, wherein the information relating to the image data in the previous color plane(s) is the image data from the last color plane in the printing sequence and difference image data from subsequent color plane(s) in the image sequence.

4. The method for encoding color image data claimed in claim 1, wherein the compressing steps are performed using JPEG compression.

5. The method for encoding color image data claimed in claim 1, wherein the information relating to the image data in the previous color plane(s) is decompressed image data from the last color plane in the printing sequence and decompressed difference image data from subsequent color plane(s) in the image sequence.

6. The method for encoding color image data claimed in claim 1, wherein the prediction steps are performed using an optimum linear predictor.

7. The method for encoding color image data claimed in claim 6, wherein the optimum linear predictor is derived via a Gram-Schmidt orthogonalization process.

8. The method for encoding color image data claimed in claim 6, wherein the previous color plane(s) used in step b) to predict the image data is a single color plane.

9. The method for encoding color image data claimed in claim 8, wherein the single color plane is the last color plane to be printed.

10. A method for encoding color image data of the type having multiple color planes for a printer that prints the color planes in a given sequence, comprising the steps of:
    a) compressing the image data in the last color plane in the printing sequence and storing the resulting compressed data;
    b) using the image data in the last color plane to predict the image data in the next color plane to be printed;
    c) forming difference image data between the image data in the next color plane to be printed and the predicted image data for that color plane;
    d) compressing the difference image data formed in step c) and storing the resulting compressed data;
    e) using the image data in the last color plane and the difference image data in the previous color plane(s) to predict the image data in the next color plane to be printed;
    f) forming difference image data between the image data in the next color plane to be printed and the predicted image data for that color plane;
    g) compressing the difference image data formed in step f) and storing the resulting compressed data;
    h) repeating steps e)–g) until the image data for all of the color planes have been compressed and stored.

11. A method for encoding color image data of the type having multiple color planes for a printer that prints the color planes in a given sequence, comprising the steps of:
    a) compressing the image data in the last color plane in the printing sequence and storing the resulting compressed data;
    b) decompressing the compressed data from step a);
    c) using the decompressed image data from step b) to predict the image data in the next color plane to be printed;
    d) forming difference image data between the image data in the next color plane to be printed and the predicted image data formed in step c) for that color plane;
    e) compressing the difference image data formed in step d) and storing the resulting compressed data;
    f) decompressing the compressed difference image data from step e);
    g) using the decompressed image data in the last color plane and the decompressed difference image data in the previous color plane(s) to predict the image data in the next color plane to be printed;
    h) forming difference image data between the image data in the next color plane to be printed and the predicted image data for that color plane predicted in step g);
    i) compressing the difference image data formed in step h) and storing the resulting compressed data;
    j) decompressing the compressed difference image data from step i);
    h) repeating steps g)–j) until the image data for all of the color planes have been compressed and stored.

12. The method of encoding color image data claimed in claim 1, further comprising the decoding steps of:
    a) decompressing the stored compressed image data that was used to predict the color plane to be printed;
    b) using the decompressed image data from step a) to predict the color plane to be printed;
    c) decompressing the stored compressed difference image data corresponding to the color plane to be printed;
    d) adding the predicted image data from step b) to the decompressed difference from step c) to reconstruct the image data for the color plane to be printed;
    e) repeating steps a)–d) until the last color plane to be printed; and
    f) decompressing the last color plane to be printed.

13. Apparatus for encoding color image data of the type having multiple color planes for a printer that prints the color planes in a given sequence, comprising:
    a) means for compressing the image data in the last color plane in the printing sequence and storing the resulting compressed data in a memory;
    b) means for using information relating to the image data in the previous color plane(s) to predict the image data in the next color plane to be printed;
    c) means for forming difference image data between the image data in the next color plane to be printed and the predicted image data for that color plane; and
    d) means for compressing the difference image data and storing the resulting compressed difference image data in the memory.

14. Apparatus for encoding color image data of the type having multiple color planes for a printer that prints the color planes in a given sequence, comprising:
    a) means for compressing the image data in the last color plane in the printing sequence and storing the resulting compressed data in a memory;
    b) means for using the image data in the last color plane to predict the image data in the next color plane to be printed;
    c) means for forming difference image data between the image data in the next color plane to be printed and the predicted image data for that color plane;
    d) means for compressing the difference image data formed in step c) and storing the resulting compressed data in the memory;
    e) means for using the image data in the last color plane and the difference image data in the previous color plane(s) to predict the image data in the next color plane to be printed;
    f) means for forming difference image data between the image data in the next color plane to be printed and the predicted image data for that color plane; and
    g) means for compressing the difference image data formed in step f) and storing the resulting compressed data in memory.

15. Apparatus for encoding color image data of the type having multiple color planes for a printer that prints the color planes in a given sequence, comprising:

a) means for compressing the image data in the last color plane in the printing sequence and and storing the resulting compressed data in a memory;

b) means for decompressing the compressed data from step a);

c) means for using the decompressed image data from step b) to predict the image data in the next color plane to be printed;

d) means for forming difference image data between the image data in the next color plane to be printed and the predicted image data formed in step c) for that color plane;

e) means for compressing the difference image data formed in step d) and storing the resulting compressed data in the memory;

f) means for decompressing the compressed difference image data from step e);

g) means for using the decompressed image data in the last color plane and the decompressed difference image data in the previous color plane(s) to predict the image data in the next color plane to be printed;

h) means for forming difference image data between the image data in the next color plane to be printed and the predicted image data for that color plane predicted in step g);

i) means for compressing the difference image data formed in step h) and storing the resulting compressed data;

j) means for decompressing the compressed difference image data from step i).

16. A computer program product, comprising: a computer readable storage medium having a computer program stored thereon for encoding color image data of the type having multiple color planes for a printer that prints the color planes in a given sequence, the computer program performing the steps of:

a) compressing the image data in the last color plane in the printing sequence and storing the resulting compressed data;

b) using information relating to the image data in the previous color plane(s) to predict the image data in the next color plane to be printed;

c) forming difference image data between the image data in the next color plane to be printed and the predicted image data for that color plane;

d) compressing the difference image data formed in step c) and storing the resulting compressed data;

e) repeating steps b)–d) until the image data for all of the color planes have been compressed and stored.

\* \* \* \* \*